(12) United States Patent
Schneider

(10) Patent No.: US 7,051,055 B1
(45) Date of Patent: May 23, 2006

(54) OPTIMIZED DISK STORAGE DEFRAGMENTATION WITH SWAPPING CAPABILITIES

(75) Inventor: Eric D. Schneider, Plymouth, MN (US)

(73) Assignee: Symantec Corporation, Cupertino, CA (US)

( * ) Notice: Subject to any disclaimer, the term of this patent is extended or adjusted under 35 U.S.C. 154(b) by 593 days.

(21) Appl. No.: 09/856,331

(22) PCT Filed: Jul. 10, 2000

(86) PCT No.: PCT/US00/18732

§ 371 (c)(1),
(2), (4) Date: May 17, 2001

(87) PCT Pub. No.: WO01/04801

PCT Pub. Date: Jan. 18, 2001

Related U.S. Application Data

(60) Provisional application No. 60/143,248, filed on Jul. 9, 1999.

(51) Int. Cl.
G06F 17/30 (2006.01)

(52) U.S. Cl. .................. 707/206; 707/202; 707/205

(58) Field of Classification Search .................. 707/8, 707/205, 200, 206; 711/103
See application file for complete search history.

(56) References Cited

U.S. PATENT DOCUMENTS

| 5,089,958 A | 2/1992 | Horton et al. |
| 5,255,270 A | 10/1993 | Yanai et al. |
| 5,297,258 A | 3/1994 | Hale et al. |
| 5,325,519 A | 6/1994 | Long et al. |

(Continued)

FOREIGN PATENT DOCUMENTS

EP   1091299 A2   4/2001

(Continued)

OTHER PUBLICATIONS

Rodriguez-Rivera et al., Proceedings of the International Symposium on Memory Management, Vancouver, Canada, Oct. 17-19, 1998, pp. 79-85, especially Figure 3 and pp. 82-83—footprint reduction.

(Continued)

*Primary Examiner*—Mohammad Ali
*Assistant Examiner*—Sathyanarayan Pannala
(74) *Attorney, Agent, or Firm*—Sonnenschein Nath & Rosenthal LLP

(57) ABSTRACT

There is disclosed apparatus and a method of de-fragmenting file allocations on a disk comprising: determining what pages should be swapped among the various allocations made by the operating system (OS), the OS's file system mapping updated to reflect the swapped pages and a history of the original state prior to any update recorded by the engine, the swaps performed by manipulation of the engine's data structures and/or actually exchanging data on disk where OS visible data is read and written but the original state of each altered page is not directly recorded in the historic log, but instead, a record is additionally logged of the locations of the swapped data so that an image of the OS visible data can be reconstructed prior to time of the de-fragmentation by knowing what data to effectively re-swap and what OS mapping data to effectively restore. The apparatus and method may include the step of incorporating desired close proximity information of various OS visible pages into the algorithm executed by the engine that determines what is actually swapped, in order to reasonable maintain physical close proximity of data allocated by the OS but physically re-mapped by the engine.

4 Claims, 5 Drawing Sheets

U.S. PATENT DOCUMENTS

| | | | |
|---|---|---|---|
| 5,331,646 A | | 7/1994 | Krueger et al. |
| 5,339,406 A | | 8/1994 | Carney et al. |
| 5,381,545 A | | 1/1995 | Baker et al. |
| 5,404,361 A | | 4/1995 | Casorso et al. |
| 5,487,160 A | | 1/1996 | Bemis |
| 5,524,205 A | | 6/1996 | Lomet et al. |
| 5,535,188 A | | 7/1996 | Dang et al. |
| 5,557,770 A | | 9/1996 | Bhide et al. |
| 5,598,528 A | | 1/1997 | Larson et al. |
| 5,604,853 A | | 2/1997 | Nagashima |
| 5,604,862 A | | 2/1997 | Midgely et al. |
| 5,628,016 A | * | 5/1997 | Kukol ............... 717/140 |
| 5,640,561 A | | 6/1997 | Satoh et al. |
| 5,659,747 A | | 8/1997 | Nakajima |
| 5,677,952 A | | 10/1997 | Blakley, III et al. |
| 5,717,849 A | | 2/1998 | Brady |
| 5,751,936 A | | 5/1998 | Larson et al. |
| 5,761,680 A | * | 6/1998 | Cohen et al. ............ 707/206 |
| 5,778,392 A | * | 7/1998 | Stockman et al. ....... 707/205 |
| 5,794,052 A | * | 8/1998 | Harding ............... 717/178 |
| 5,802,264 A | | 9/1998 | Chen et al. |
| 5,819,015 A | * | 10/1998 | Martin et al. .......... 358/1.15 |
| 5,835,953 A | | 11/1998 | Ohran |
| 5,893,140 A | | 4/1999 | Vahalia et al. |
| 5,933,368 A | | 8/1999 | Ma et al. |
| 5,982,886 A | | 11/1999 | Itami et al. |
| 6,012,145 A | | 1/2000 | Mathers et al. |
| 6,016,553 A | | 1/2000 | Schneider et al. |
| 6,038,636 A | * | 3/2000 | Brown et al. ............ 711/103 |
| 6,199,178 B1 | | 3/2001 | Schneider et al. |
| 6,240,527 B1 | | 5/2001 | Schneider et al. |
| 6,263,338 B1 | * | 7/2001 | Ronstrom et al. ............ 707/8 |
| 6,289,446 B1 | * | 9/2001 | Nilsson ............... 712/244 |
| 6,345,283 B1 | * | 2/2002 | Anderson ............... 707/205 |
| 6,363,487 B1 | | 3/2002 | Schneider |

FOREIGN PATENT DOCUMENTS

| | | |
|---|---|---|
| EP | 0751462 B1 | 7/2002 |
| JP | 62-114595 A | 11/1988 |
| JP | 01-036972 A | 8/1990 |
| JP | 02-290700 | 6/1992 |
| JP | 04-038739 A | 8/1993 |
| JP | 07-059861 A | 9/1996 |
| WO | WO 91/01026 | 1/1991 |
| WO | WO 96/12232 | 4/1996 |
| WO | WO 98/26353 | 6/1998 |
| WO | WO 99/12101 | 3/1999 |
| WO | WO 99/56212 * | 11/1999 |
| WO | WO 00/65447 | 11/2000 |
| WO | WO 01/04801 A1 | 1/2001 |
| WO | WO 01/33357 A1 | 5/2001 |

OTHER PUBLICATIONS

International Search Report of PCT/US00/10999, Sep. 1, 2000.

Hultgren, C.D., "Fault-tolerant Personal Computers Safeguard Critical Applications," I&CS Instruments And Control Systems, vol. 65, No. 9, Radnor, PA, US, pp. 23-28, (Sep. 1992).

Robinson, J.T., "Analysis Of Steady-State Segment Storage Utilizations In A Log-Structured File System With Least-Utilized Segment Cleaning," IBM Research Division, T.J. Watson Research Center, Oct., 1996, pp. 29-32.

Green R.J. et al., "Designing a Fast, On-line Backup System For A Log-Structured File System," Digital Technical Journal, vol. 8, No. 2, 1996, pp. 32-45.

Castelletto et al., "DB2 for VSE & VM Archiving and Recovery", IBM VSE/ESA, 1-18, (1996).

Seltzer et al., "An Implementation of a Log-Structured File System for UNIX," Proceedings of the Winter 1993 USENIX Technical Conference, USA USENIX Jan., 1993, pp. 307-326.

Suzuki et al., "A Design of a File Manager with History Management Mechanism," Technical Report of Information Processing Society of Japan, Japan, IPSJ, Oct. 29, 1993, vol. 93, No. 96 (93-DBS-96) pp. 75-83. (abstract in English).

Gray et al., "Transaction Processing: Concepts and Techniques," U.S.A. Morgan Kaufmann Publishers, Inc. 1993, pp. 723-732.

* cited by examiner

| Page#1 | Page#2 | Page#3 | Page#4 | Page#5 | Page#6 | Page#7 | Page#.. |
|---|---|---|---|---|---|---|---|
| File C | File C | File B | File B | File B | File C | --- | --- |

| Page#1 | Page#2 | Page#3 | Page#4 | Page#5 | Page#6 | Page#7 | Page#.. |
|---|---|---|---|---|---|---|---|
| File C | File C | File C | File B | File B | File B | --- | --- |

OPTIMIZED DISK STORAGE DEFRAGMENTATION WITH SWAPPING CAPABILITIES

PRIORITY CLAIM

This application claims priority from U.S. Provisional Application No. 60/143,248, filed Jul. 9, 1999, entitled "Method, Software And Apparatus For Saving, Using And Recovering Data", the entire disclosure of which is hereby incorporated by reference herein.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright© 1999, Wild File, Inc. All Rights Reserved.

TECHNICAL FIELD OF THE INVENTION

The present invention pertains generally to the storage of digital data, and more particularly to method and apparatus for de-fragmenting the allocations of storage made by an operating system for the files under its management within the context of a change tracking system that supports the backup and recovery of data stored by a digital computer.

BACKGROUND OF THE INVENTION

A typical problem for a computer's operating system (OS) is the eventual fragmentation of storage on disk. An OS generally manages the disk for the applications (like a word processor) and provides means for the applications to save and recall all or parts of files. The disk storage for the files is allocated and released by the OS as it is used by the applications. The OS may assign, for example, disk pages #1 and #2 to represent some file A, and disk pages #3, #4, and #5 for some file B. Now if the user through an application deletes file A and creates a new file C that requires three pages, the OS could re-use pages #1 and #2 and further allocate page #6. As shown in FIG. 1, the disk now contains two files: file B occupying pages #3, #4, and #5, and file C occupying pages #1, #2, and #6.

One of the realities of a disk drive is that it generally takes a long time to position the disk head to a given location on the recording media, as compared to the time it takes to transfer data. Thus, in order to attain optimal performance, in terms of response time, it is best to store all the data associated with a given file in nearby locations. This minimizes the number of times the disk head must be re-positioned in order to access all the file's data. However, in our current example, the OS split the allocations for file C into two groups: pages #1 and #2, and page #6. Thus, because the disk head must be re-positioned twice to read both groups, it takes roughly twice as long to read file C as it does to read file B, which is allocated in one group (pages #3 through #5).

The OS may employ various strategies to avoid breaking up files across a disk, but due to the dynamic nature of file sizes on a computer (they grow and shrink all the time), files over time generally become fragmented. The solution is to run a de-fragmentation utility (which is generally either built into the OS or comes as its own application). Such a utility corrects the problem by re-arranging the disk's contents such that the data for a given file is generally allocated in one area, or at least in large groups. FIG. 2 illustrates how the disk in our example would appear after de-fragmentation. Note that the internal OS data structures that track the whereabouts of the data for each file are updated during de-fragmentation to reflect the new page assignments.

The recovery invention described in U.S. Pat. No. 6,016,553 details a method of at least initially re-mapping the page assignments of the OS, and generally without its knowledge. This is done to avoid overwriting the original contents of the affected pages so that these states can be restored or utilized in re-constructing the state of the disk, as viewed by the OS, at some time in the past. The preserved pages collectively make up a circular history buffer, and as new data is written by the OS, the older historic pages are recycled and receive the new data. The act of writing by the OS reduces the distance back in time that can be reconstructed using the data in the history buffer. In other words, when the OS writes data, pages are recycled within the history buffer to record the original states of these recent writes, at the expense of losing the original states associated with writes made relatively a long time ago.

Therefore, when a de-fragmentation utility is run, and it rearranges the disk, a lot of writes are generated. These writes push out data from the history buffer. Thus, although the user can use the recorded original states in the history buffer to re-construct an image of the disk prior to performing the de-fragmentation, this is generally of little value compared to the historic data that has just been pushed out of the history buffer. There is the case where a de-fragmentation process fails and data is lost, in which case a user would want to return to the time prior to de-fragmenting. However, if you set aside this case and assume that the de-fragmentation utility generally works, the user sees no change in their data. The disk re-arrangement did not alter the state of any file, it just improved the access time to it. Thus, intuitively a user may not understand why de-fragmenting a disk should "consume" any of the history buffer.

De-fragmenting can have a very nasty effect on the history buffer. Generally, a user has some sense of how much data is being written by any given activity. When a user loads a new application it often informs him/her of the space required—a good indication of how much is about to be written. When an application is run (launched), typically a relatively small amount of data is written relative to the total size of the history buffer. However, because de-fragmenting involves looking at all the data on the disk, and often involves moving much of it (regardless of whether it has recently changed), this operation is perhaps unique in its almost unpredictable effect of pushing large amounts of historic data out of the buffer.

In summary, on system implementing the recovery methods of U.S. Pat. No. 6,016,553 (engine) the effect of a standard disk de-fragmentation utility on the availability of historic information is possibility to eliminate all or much of the historic data that was available prior to the de-fragmentation. Further, the system might crash during a de-fragmentation and restart with data having been lost. Normally this would be a opportune point to use the recovery ability of the engine. However, should the de-fragmentation process have written so much data that the data captured in the history buffer no longer spans back to the beginning of the process, then recovery is not possible. Such unpredictable situations where the recovery option is lost undermines the value of the engine.

SUMMARY OF THE INVENTION

The present invention provides apparatus and a method of de-fragmenting file allocations on a disk comprising: determining what pages should be swapped among the various allocations made by the operating system (OS), the OS's file system mapping updated to reflect the swapped pages and a history of the original state prior to any update recorded by the engine, the swaps performed by manipulation of the engine's data structures and/or actually exchanging data on disk where OS visible data is read and written but the original state of each altered page is not directly recorded in the historic log, but instead, a record is additionally logged of the locations of the swapped data so that an image of the OS visible data can be reconstructed prior to time of the de-fragmentation by knowing what data to effectively re-swap and what OS mapping data to effectively restore. The apparatus and method may include the step of incorporating desired close proximity information of various OS visible pages into the algorithm executed by the engine that determines what is actually swapped, in order to reasonably maintain physical close proximity of data allocated by the OS but physically re-mapped by the engine.

DETAILED DESCRIPTION

Figures 1, 2, 3A:
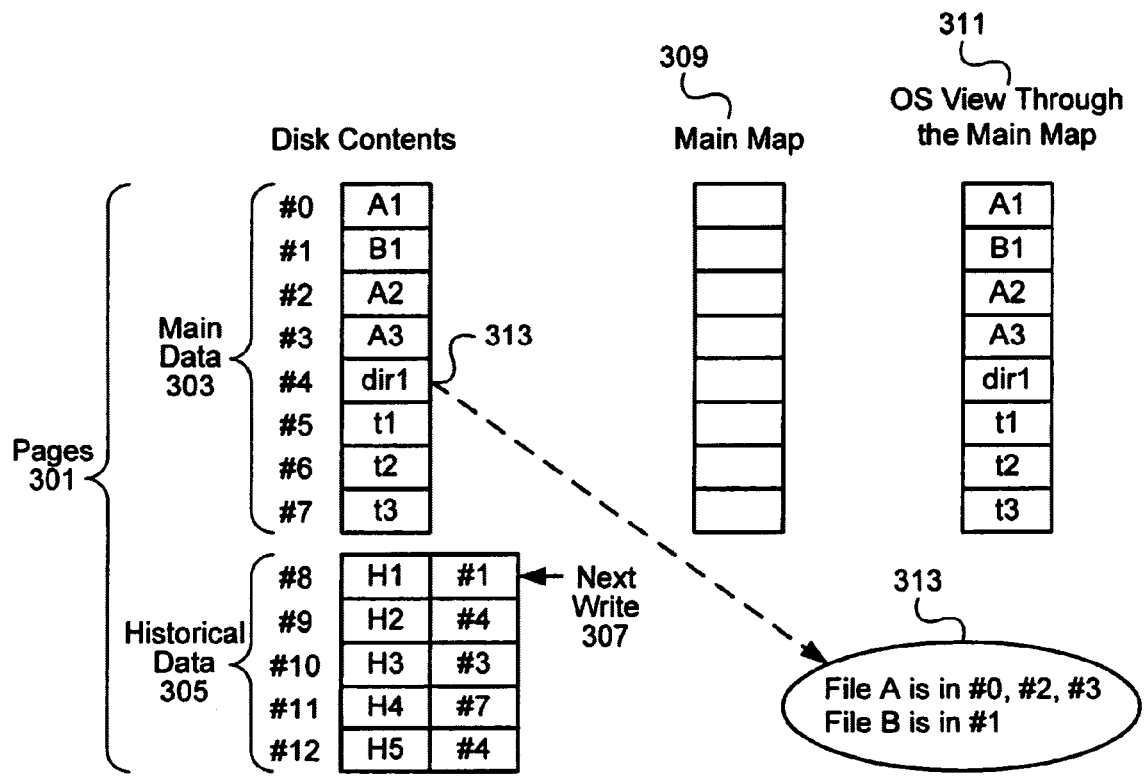
FIGS. 1 and 2 illustrate a defragmentation process.
FIGS. 3A–3E illustrate defragmentation apparatus, structures and methods according to example embodiments of the invention.

It is possible to modify the engine to allow for the insertion of a de-fragmentation step in the history buffer. This is the subject of the present invention, which is based on the realization that at the core of the de-fragmentation process is the re-arrangement of disk pages. De-fragmenting a disk is not so much involved in the generation of truly new data that is not already present on the disk—e.g., the OS's internal data structures describing the whereabouts of each file get updated in the process, which does represent true changes to the disk's contents, but the rearranging of the pages holding a file's data is not creating truly new data, but simply moving it.

To see why the de-fragmentation process involving reading and writing data all over the disk does not actually require much space to represent the before and after states, one needs to look closer at the meaning of "moving" and "rearranging" data. When data is moved from one location X to location Y, the operation implies the overwriting of the contents of location Y. Its original contents are lost. Therefore, it is not possible to reverse a "move" operation unless somehow the original state is preserved. However, a typical de-fragmentation utility "moves" much of the data only because it utilizes the read and write operations provided by the disk. The point is that when you write to the disk, this is generally a non-reversible operation. However, at a higher level, what the de-fragmentation process really involves is primarily rearranging the disk, which is to say swapping disk locations. A swap of data involves exchanging the contents of some location X with some location Y. A swap operation, unlike a move, is reversible.

Therefore, one only needs to know what locations were swapped in order to return the disk to its pre-swapped state, and specifically, there is no need to record the original contents of any of pages involved in the swap. For example, if a disk had a million pages and in order to de-fragment the disk, the first 100,000 pages were swapped with the last 100,000 pages, the operation could be fully reversed (undone) by simply re-swapping the pages. A note that "the first 100,000 pages were swapped with the last" can be recorded in a handful of bytes. This allows for the before and after states of the disk to be reconstructed as needed, without having saved any "original states" of the actual data moved in the swap. In other words, outside of the space required to save notes about what gets swapped in a de-fragmentation process, little other space is required. These means that a major de-fragmentation of a disk can be performed without having to "push" much of the tracked historic original disk states out of the circular history buffer.

Note that the techniques just described for performing a disk de-fragmentation that minimally impacts the contents of the history buffer assumes the use of a utility that is aware of the present invention, and implements the de-fragmentation primarily using swap operations instead of the traditional read and write (move) operations.

To gain further insight into the present invention, FIG. 3 walks through a traditional de-fragmentation process. FIG. 3a illustrates the initial state of the system. The disk contents are shown on the left side, with each page 301 identified 0 through 12 (i.e., the disk consists of 13 pages). The pages are divided into two sets, one group corresponding to those 303 visible by the OS and the other group reserved for tracking changes (history buffer 305). The roles of these pages are somewhat fluid as they go from holding data associated with the current main image (303, data visible to the OS) to holding the original (historic, 305) states of pages overwritten by the OS. The various methods for managing the pages are discussed in U.S. Pat. No. 6,016,553. The purpose of this figure is to illustrate the use of disk pages for main 303 and historic 305 data.

The top group of pages 0 through 7 start out holding main image data 303. The bottom group of pages 8 through 12 hold historic data 305, with the associated location field off to the right. This field, along with maps and other internal information, are maintained on disk by the engine in pages not shown in this example. The "next write" pointer 307 indicates the next location to recycle (oldest historic data). As new data is written by the OS, it is diverted to the "next write" location in the bottom pages 305 and the associated location field is updated with the original OS write's disk location. In the center of the figure is the main map through which the engine translates OS disk read requests to the actual (physical) disk location containing the desired data. At right are shown the current contents 311 of the disk as viewed by the OS through the main map 309. Since the main map 309 is initially empty, reflecting a "no mapping state," the current image visible to the OS, locations 0 through 7, directly correspond to the contents of these actual disk locations 303.

Initially the disk contains pages making up two files A and B. The allocation of file A is fragmented in that an allocation for file B is intermixed among the pages allocated to A. Disk location #4 holds the OS's directory 313, which is detailed off to the right. The directory 313 indicates the locations associated with each file. The pages containing data t1, t2, and t3 correspond to "unused" storage by the OS (free disk space 315). Pages 8 through 12 initially contain historic data 305. It is the historic data 305 that one does not want to lose, as much as possible, during a de-fragmentation.

Figure 3B:
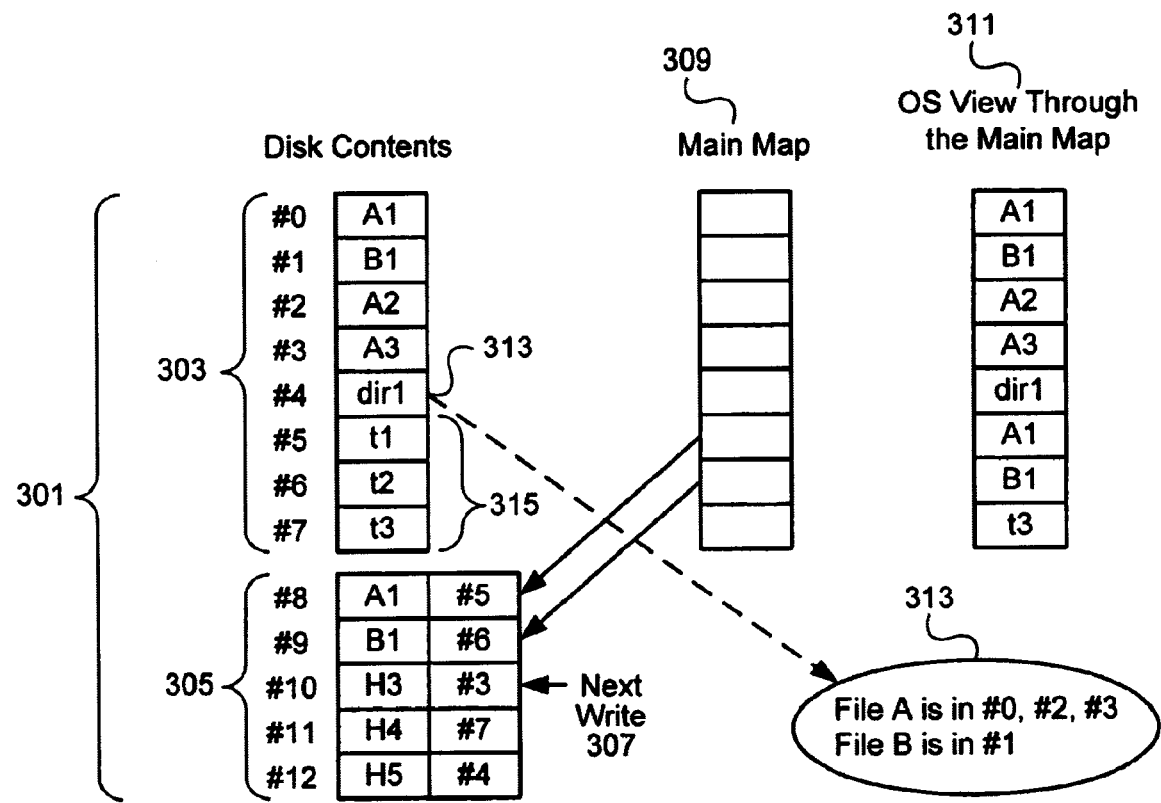

FIG. 3b illustrates the first step of a typical de-fragmentation utility. It decides to exchange the contents of pages 0 and 1 so that all the allocations associated with file A are next to each other, thus transforming the sequence "A1 B1 A2 A3" into "B1 A1 A2 A3." The directory 313 is also updated to reflect the new assignments. As the de-fragmentation utility intends to overwrite the data in pages 0 and 1, it must get this data out of the way. The first step is to copy the data A1 and B1 to unused locations t1 and t2. Let us presume the de-fragmentation utility is unaware of the recovery methods of U.S. Pat. No. 6,016,553. Thus, what has really happened when the data A1 and B1 was overwritten on top of t1 and t2, is that the writes were diverted by the engine and the main map 309 updated.

Figure 3C:
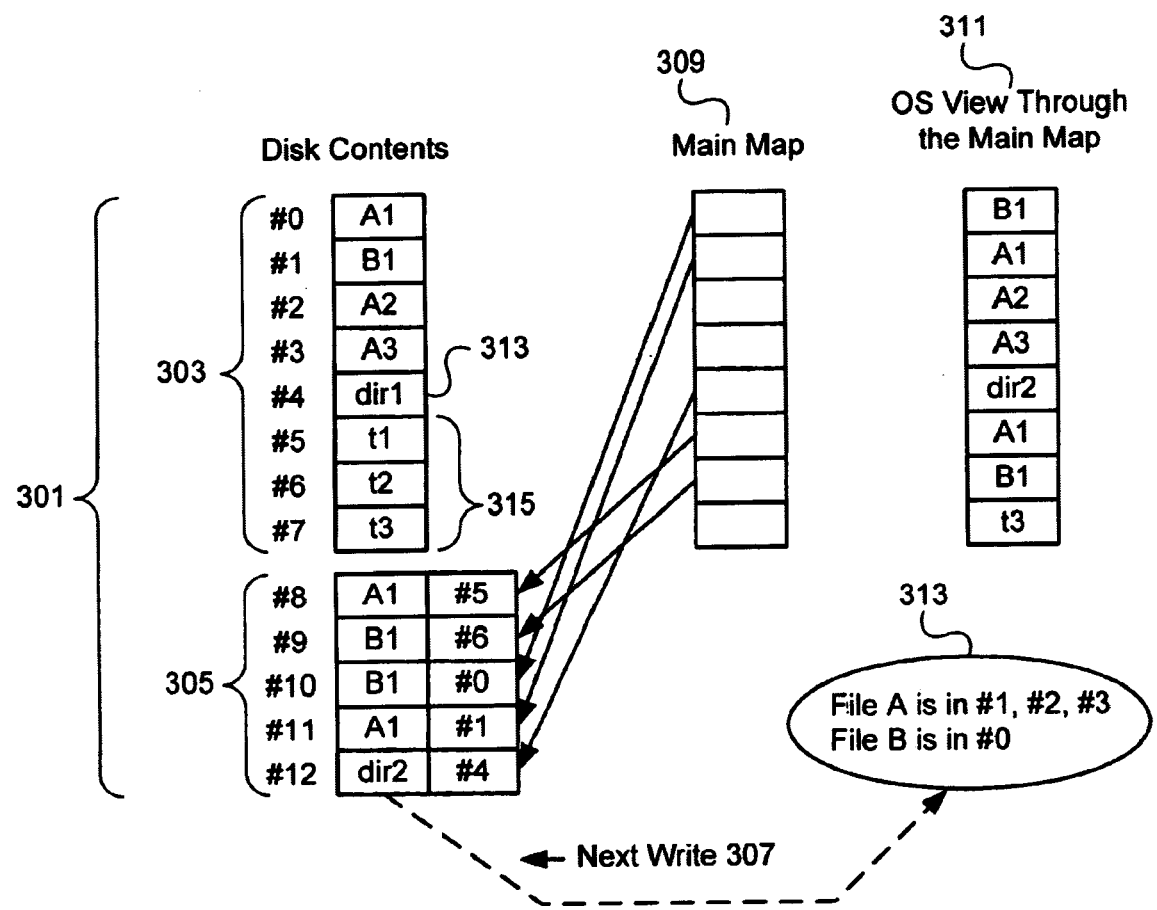

FIG. 3c shows the results of the de-fragmentation utility's moving A1 and B1 into place and updating the directory. Now as the OS views the disk through the main map 309 the disk appears de-fragmented. Generally, various background disk re-arranging activity of the engine re-optimizes the placement of data on disk to take advantage of the de-fragmentation (i.e., so that file A's allocations are near other). What is important to notice in FIG. 3c is that all of the original historic data 305 H1 through H5 has been discarded in order to save a record of the modified locations. Because all the original states have been preserved prior to the de-fragmentation, it is possible to exactly reconstruct the before de-fragmentation disk image, as viewed by the OS.

Note that it is not the intent of this example to show the specific steps and methods employed by a disk de-fragmentation utility, but only the general process and effects.

The present invention, however, provides for the same before and after tracking but without requiring so much of the history buffer to record the steps to reverse the process. Thus, if you return to the state in FIG. 3a and use a new de-fragmentation utility that is aware and interacts with the engine, you get FIG. 3d. It shows that the engine aware de-fragmentation utility requested the engine to swap 317 locations 0 and 1 and then it updated the directory 313. Notice that more than half of the history buffer's original contents are still present, thus allowing the user to reconstruct states further back in time as compared to FIG. 3c.

Figure 3D:
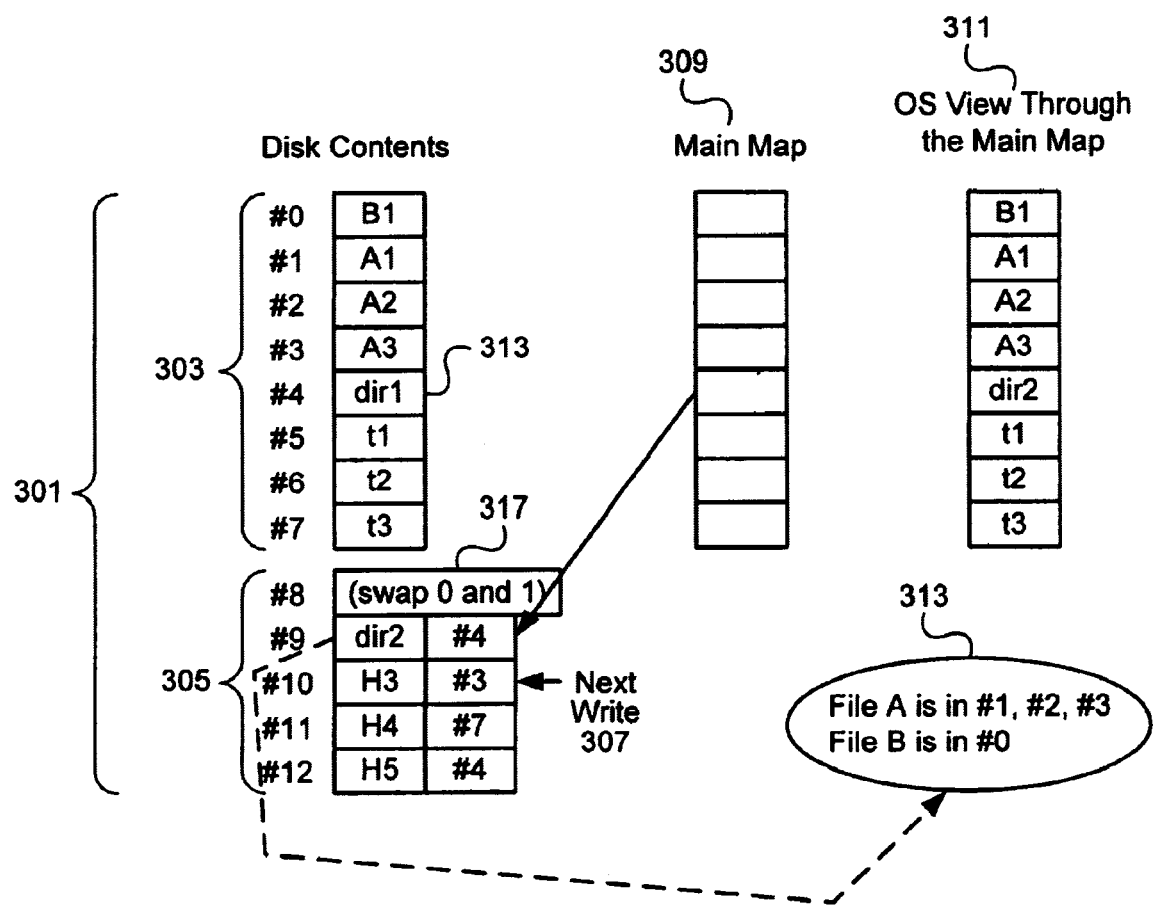

The "swap" is represented in FIG. 3d as a special type of entry 317 in the table of disk locations and associated location fields. The actual method of storing the swap information is likely to use some combination of the location fields stored in the history buffer headers (see U.S. Pat. No. 6,016,553) and other disk data structures (such as, but not limited to, the General Logged Data pages as also described in U.S. Pat. No. 6,016,553).

Figure 3E:
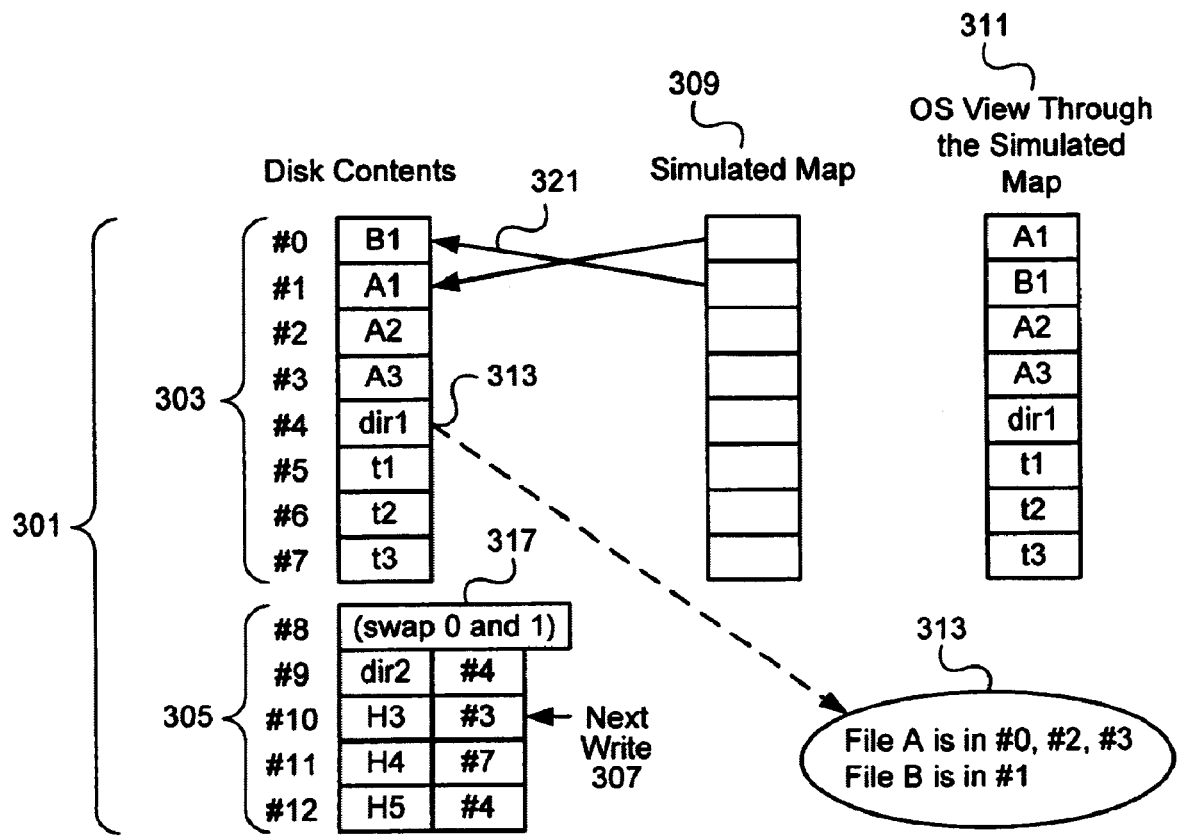

FIG. 3e illustrates a simulated disk map 319 used to access the disk image before the de-fragmentation. The simulated map 319 is constructed by reversing the steps recorded in the history buffer: the diversion of accesses to location #4 is ended, which restores the OS's original directory mapping 313. The swap is "undone" by performing the swap again, only this time using the links 321 in the simulated map to "exchange" the pages.

The other major operation implemented by the engine is the disk revert. A disk reversion is performed by effectively writing the changes recorded in the history buffer 305 back to the main image 303. When a note about a swap 317 is encountered while walking back toward an earlier time in the history buffer 305, the swap is simply done again to undo its original effect. Note the swap may be implemented by actually exchanging pages and/or through the use of map pointers.

It makes sense that the de-fragmentation algorithm understands the placement implications of the engine. In other words, it may query the engine to find out about current and planned re-location of disk pages as different from the locations assigned by the OS. Alternately, the de-fragmentation algorithm (OS) may supply the engine with information sufficient for it to adjust its placement (re-mapping) of data and thus accomplish de-fragmentation.

The present invention works particularly well with the Temp Method in that this method eventually moves diverted data back into its original OS assigned (written) locations. Therefore, the de-fragmentation process needs only look at the OS's assigned locations (location keys) to make correct assumptions about what will, at least eventually be the actual physical locations of the data.

THE PRESENT INVENTION AND THE ALWAYS METHOD

The Always Method envisioned a tight relationship between the de-fragmentation process and the engine. It proposed two methods of dealing with fragmentation: one where the OS directly provides adjacency information of the allocations associated with each file to the engine, and another where the OS re-sequences the locations assigned to the files, coordinating the "renumbering" with the engine.

In the case where the engine directly receives adjacency information, instead of de-fragmenting the allocations as represented in the OS's file mapping, the OS can keep its "fragmented" allocations and assumes the engine will re-map assignments to eliminate actual fragmentation. For example, consider the case where the OS has assigned location keys 1, 10, 20, and 30 to a file. However, the engine has re-mapped location key 1 to the physical disk location 50, 10 to 51, 20 to 52, and 30 to 53. Thus, reading the file actually causes the actual disk locations 50, 51, 52, and 53 to be read, which is optimal (continuous).

The Always method also envisioned a re-sequencing process where the disk allocations for a file made by the OS would be re-sequenced (see the end of the Disk Access Performance section). Re-sequencing file allocations within the OS differs from a de-fragmenting process in that the OS simply pauses, and makes a pass through all its allocations associated with each file and sequentially renumbers them. It is the engine's responsibility to actually determine where the allocations were (before re-sequencing) and keep the allocations properly associated with the newly assigned location keys.

Re-sequencing attempts to eliminate the need for a separate adjacency map within the engine. In other words, consider the case where the OS has assigned some file the location keys 10, 34, and 13 to correspond to the first, second, and third pages that respectively make up the file's contents. The data will have been likely written to some other actual disk locations (the location key and the actual disk location that receives the data will differ due to diversion by the engine). The OS could inform the engine of the desired adjacency of these locations by re-sequencing them. Thus, it might submit a request to the engine indicating location key 10 will now be accessed as location key 1, 34 as 2, and 13 as 3. Of course, the process of re-sequencing must either insure the newly assigned location keys (1, 2, and 3 in this example) have not already been used, or specify to what location keys these have been re-assigned (e.g., 1 to 40, 2 to 41, and 3 to 42). The point of re-sequencing is that the engine, after re-sequencing can assume implied desired adjacency in the location keys (e.g., location keys 1, 2, and 3 should be mapped to actual pages on disk that are near each other).

Note that the re-sequencing process of passing file allocation information to the engine should also include the points at which file breaks occur. For example, one file has been re-sequenced to location keys 5, 6, and 7, and another file to location keys 8, 9, and 10. Therefore, the engine would know that it could physically map the location keys 5 through 10 to two different areas, keeping the pages associated with 5, 6, and 7 together and 8, 9, and 10 together. This is the same concept as found in the structure of the adjacency information provided to the engine in U.S. Pat. No. 6,016,553.

The de-fragmentation process of the present invention is like re-sequencing in that the engine can infer desired adjacency of the OS's allocations by their location—sequential location key assignments should be mapped near each other. However, the de-fragmentation process assumes a much greater role of selecting what locations to swap in order to minimize the amount of storage that must be exchanged. In contrast to re-sequencing, the de-fragmentation process of the present invention does not rely as much on the engine to work out the actual steps involved in rearranging the disk.

In both the re-sequencing and de-fragmenting processes the OS is adjusting its own file allocation mappings to be more sequential as a step toward directly (Temp Method) or indirectly (Always Method) establishing close physical proximity on a file's allocations on disk. There may also be advantages for the OS to have a file's allocations made sequentially due to the implementation of the OS's own file mapping system. In general, either for the OS or an engine, it is more efficient to map continuous sequences of values. For example, a table could map the values 1,2,3,4 to the values 7,8,9,10. The table consists of eight numbers. On the other hand, three numbers represent this same mapping if expressed as "map the values starting at 1 to 7 for 4 sequential values." If the continuous sequences are long then great efficiency can be achieved over mapping each value independently.

The Always Method has already established the concept of adjusting the OS's file mapping in a coordinated effort with the engine and/or more directly informing the engine of adjacency preferences. It has already stated the need to include notes reflecting such action in some form in the general history log (see the end of section on the Desired Location Map section). Therefore the core of the present invention primarily provides detailed steps to de-fragment a disk under the Temp Method, borrowing from the Always Method the process of allowing and recording an engine/OS mapping (swap) change in the history log.

Under the Always Method it is recommended to provide for the de-fragmentation of files by the following three steps: First, have some program scan the OS's file allocations and request the appropriate swaps in order to insure each file's page assignments (location keys) are generally sequential. Second, update the OS's maps. These first two steps describe the present invention and suffice for the Temp Method. However, for the Always Method, a third step is added in which adjacency information is also supplied to the engine. With the requested swaps and adjacency information the Always Method can determine what actually gets swapped and update its own mapping.

The general de-fragmentation of allocations as viewed by the OS may or may not improve its own mapping and new page allocation efficiency. However, de-fragmenting a file's location keys will at minimum allow the adjacency information to be more compact (more blocking). Further, it will almost certainly improve the efficiency at which the engine can translate from OS locations to actual physical locations. This is because common mapping methods like trees or table based algorithms work best when a sequence of look up keys are sequential. For example, in a common operation, the OS requests to read a given file, which the OS has mapped to location keys 10, 11, 12, 13, and 14. This nice sequential allocation is perhaps the result of de-fragmentation. As the reads are passed either individually or as a block to the engine for re-mapping, in general the common methods for re-mapping will cluster the look up keys (10, 11, . . . ) close to their re-mapped values. The principle that this clustering leads to efficiency is well understood in the art.

Note the actual method for an Always Method engine of determining how to re-arrange the data on a disk, based on its current mapping, the requested swaps, and adjacency information is reasonably straight forward to one skilled in the art of data structures and programming. A simple algorithm would involve working from the adjacency information back through the swaps to determine if the actual physical data needs to be exchanged in order to achieve close proximity, or simply an update made to the engine's maps.

What is claimed:

1. A method of defragmenting file allocations on a disk, the method comprising:
    determining pages to be swapped among various allocations made by an operating system (OS);
    swapping determined pages by performing a step from a group of steps consisting of: a) manipulating data structures so as to indicate swapping of pages without actually swapping data between physical locations on a medium; and b) moving data on a medium where OS visible data is read and written;
    updating an OS file system mapping to reflect the swapped pages;
    logging indications of the swapped pages so that an image of the OS visible data prior to the swapping can be reconstructed, without requiring that each read operation and each write operation be written to a history log; and
    incorporating desired close proximity information of various OS visible pages into an algorithm executed by an engine that determines pages to be swapped, in order to reasonably maintain close physical proximity of data allocated by the OS but physically re-mapped by the engine.

2. The method of claim 1, wherein the method is performed on a computer wherein a history of data is maintained such that the computer can be returned to a state of data from an earlier point in time.

3. The method of claim 1, wherein the method is performed on a computer wherein a history of data is maintained such that the computer can be returned to a state of data from an earlier point in time.

4. A method according to claim 3, wherein the historical data is maintained by diverting writes to a different position on the disk so historical data remains in its original location.

* * * * *

UNITED STATES PATENT AND TRADEMARK OFFICE
CERTIFICATE OF CORRECTION

PATENT NO. : 7,051,055 B1  Page 1 of 1
APPLICATION NO. : 09/856331
DATED : May 23, 2006
INVENTOR(S) : Eric D. Schneider It is certified that error appears in the above-identified patent and that said Letters Patent is hereby corrected as shown below:

On column 1, at number 57, please change "reasonable" to --reasonably--.

Signed and Sealed this

Seventh Day of November, 2006

JON W. DUDAS
*Director of the United States Patent and Trademark Office*